United States Patent
Yarker et al.

(10) Patent No.: US 10,163,185 B1
(45) Date of Patent: Dec. 25, 2018

(54) SYSTEMS AND METHODS FOR USER DRIVEN AVIONICS GRAPHICS

(71) Applicant: Rockwell Collins, Inc., Cedar Rapids, IA (US)

(72) Inventors: Craig A. Yarker, Cedar Rapids, IA (US); John J. Kassie, Center Point, IA (US); Jason A. Myren, Marion, IA (US); Nicholas A. Paxton, Cedar Rapids, IA (US); Levi D. Van Oort, Clarence, IA (US); Prashant Srivastava, Uttar Pradesh (IN)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 128 days.

(21) Appl. No.: 15/279,052

(22) Filed: Sep. 28, 2016

(51) Int. Cl.
*G06T 1/20* (2006.01)
*G06T 1/60* (2006.01)

(52) U.S. Cl.
CPC . *G06T 1/20* (2013.01); *G06T 1/60* (2013.01)

(58) Field of Classification Search
CPC .................................. G06T 1/20; G06T 1/60
USPC ......................................... 345/501; 715/700
See application file for complete search history.

(56) References Cited

U.S. PATENT DOCUMENTS 9,208,270 B2 * 12/2015 Fontes ................ G06F 17/5018
2017/0344191 A1 * 11/2017 Zandee ................. G06F 3/0481

OTHER PUBLICATIONS

U.S. Appl. No. 14/499,649, filed Sep. 29, 2014, Van Oort et al.

* cited by examiner

*Primary Examiner* — Jacinta M Crawford
(74) *Attorney, Agent, or Firm* — Donna P. Suchy; Daniel M. Barbieri (57) ABSTRACT

A system includes a first graphics interface, a second graphics interface, and a display system. The first graphics interface is configured to receive first graphics instructions from a user application, identify an abstraction mode of the user application, and generate second graphics instructions based on the first graphics instructions and the abstraction mode. The second graphics interface is configured to receive the second graphics instructions from the first graphics interface and generate a widget based on the second graphics instructions. The display system includes a graphics generator and a display device. The graphics generator is configured to generate a visual representation based on the widget. The display device is configured to display the visual representation.

18 Claims, 4 Drawing Sheets

SYSTEMS AND METHODS FOR USER DRIVEN AVIONICS GRAPHICS

BACKGROUND

The inventive concepts disclosed herein relate generally to the field of avionics systems. More particularly, embodiments of the inventive concepts disclosed herein relate to user driven avionics graphics for displaying on avionics systems.

As aircraft avionics systems become increasingly complex, integrating avionics systems with aircraft display systems and communication standards, such as the ARINC-661 specification, may require complex end user applications in order to leverage the improved features of such systems. It can be difficult to develop such applications that effectively integrate with avionics systems, particularly for users having varied levels of expertise.

SUMMARY

In one aspect, the inventive concepts disclosed herein are directed to a system. The system includes a first graphics interface, a second graphics interface, and a display system. The first graphics interface is configured to receive first graphics instructions from a user application, identify an abstraction mode of the user application, and generate second graphics instructions based on the first graphics instructions and the abstraction mode. The second graphics interface is configured to receive the second graphics instructions from the first graphics interface and generate a widget based on the second graphics instructions. The display system includes a graphics generator and a display device. The graphics generator is configured to generate a visual representation based on the widget. The display device is configured to display the visual representation.

In a further aspect, the inventive concepts disclosed herein are directed to an airborne platform. The airborne platform includes a first avionics system, an electronic bus communicatively coupled to the first avionics system, and a second avionics system communicatively coupled to the electronic data bus. The first avionics system includes an application configured to generate first graphics instructions. The second avionics system includes a processing circuit and a display device. The processing circuit includes a first graphics interface and a second graphics interface. The first graphics interface is configured to receive the first graphics instructions from the first avionics system via the electronic data bus, identify an abstraction mode of the first graphics instructions, and generate second graphics instructions based on the first graphics instructions and the abstraction mode. The second graphics interface is configured to receive the second graphics instructions from the first graphics interface and generate a widget based on the second graphics instructions. The display device is configured to display a visual representation of the widget.

In a further aspect, the inventive concepts disclosed herein are directed a method. The method includes receiving, at a first graphics interface, first graphics instructions associated with an abstraction mode. The method includes generating, by the first graphics interface, second graphics instructions based on the first graphics instructions and the abstraction mode. The method includes generating, by a second graphics interface, a widget based on the second graphics instructions. The method includes displaying, by a display device, a visual representation based on the widget.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), or both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Broadly, embodiments of the inventive concepts disclosed herein are directed to systems and methods for an avionics graphics interface, such as for user-driven avionics graphics. The inventive concepts disclosed herein can be utilized in a number of control systems for various types of electronic avionics applications for airborne platforms (e.g., aircraft), including but not limited to flight control and autopilot systems, navigation systems, flight display systems, communications systems, radar systems, electric power systems, engine control systems, and monitor warning systems. While the present disclosure describes systems and methods implementable for an airborne platform, the inventive concepts disclosed herein may be used in any type of environment (e.g., in another aircraft, a spacecraft, a ground-based vehicle, or in a non-vehicle application such as a ground-based display system, an air traffic control system, a radar system, a virtual display system).

In some embodiments, a system includes a first graphics interface, a second graphics interface, and a display system. The first graphics interface is configured to receive first graphics instructions from a user application, identify an abstraction mode of the user application or the first graphics instructions, and generate second graphics instructions based on the first graphics instructions and the abstraction mode. The second graphics interface is configured to receive the second graphics instructions from the first graphics interface and generate a widget based on the second graphics instructions. The display system includes a graphics generator and a display device. The graphics generator is configured to generate a visual representation based on the widget. The display device is configured to display the visual representation. The system can be integrated with an airborne platform (e.g., the avionics system can be an avionics system of the airborne platform, and the display system can be an aircraft cockpit display of the airborne platform). The system can be compatible with a standard graphics interface (e.g., the second graphics interface can be an ARINC-661 graphics application programming interface or compatible with an ARINC-661 specification). Systems manufactured in accordance with the inventive concepts disclosed herein can improve the operation of airborne platforms by abstracting complexities associated with ARINC-661 to expedite user application development while reducing support needed for end users to develop user applications. Systems manufactured in accordance with the inventive concepts disclosed herein can also improve the operation of airborne platforms by providing heterogeneous tiers, modes, or layers of abstraction for user application development to suit the varying skills, familiarity, complexity, and expertise of end users.

Figure 1:
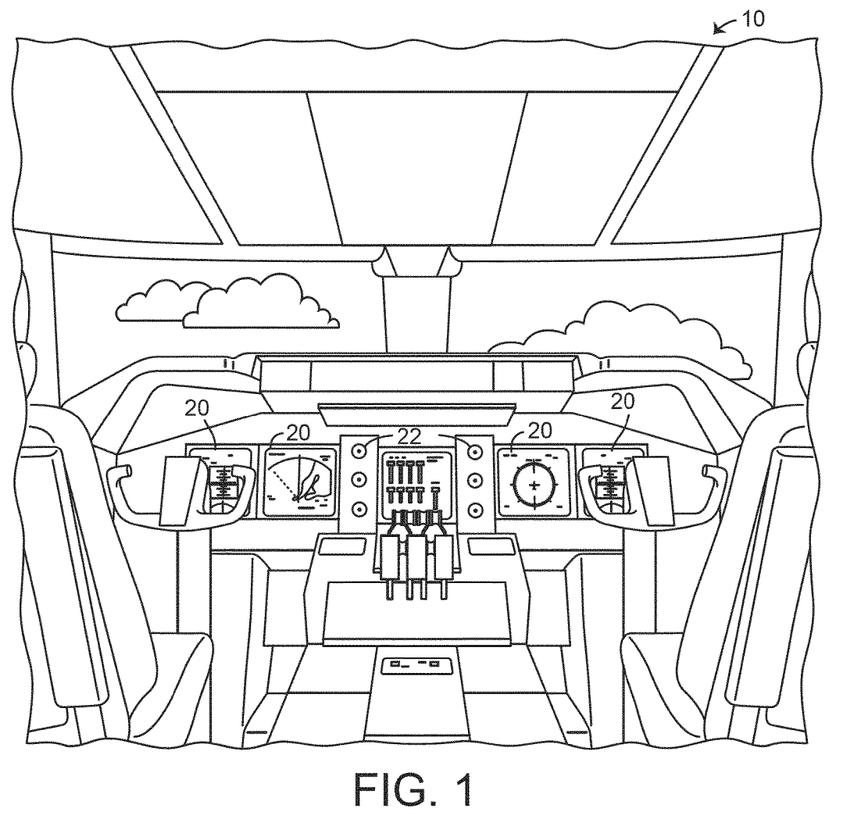
FIG. 1 is a schematic illustration of an exemplary embodiment of an aircraft control center according to the inventive concepts disclosed herein.

Referring to FIG. 1, a perspective view schematic illustration of an aircraft control center or cockpit 10 is shown accordingly to an exemplary embodiment of the inventive concepts disclosed herein. The aircraft control center 10 can be configured for an aircraft operator or other user to interact with avionics systems of an airborne platform. The aircraft control center 10 may include one or more flight displays 20 and one or more user interface ("UI") elements 22. The flight displays 20 may be implemented using any of a variety of display technologies, including CRT, LCD, organic LED, dot matrix display, and others. The flight displays 20 may be navigation (NAV) displays, primary flight displays, electronic flight bag displays, tablets such as iPad® computers manufactured by Apple, Inc. or tablet computers, synthetic vision system displays, head up displays (HUDs) with or without a projector, wearable displays, watches, Google Glass®. The flight displays 20 may be used to provide information to the flight crew, thereby increasing visual range and enhancing decision-making abilities. One or more of the flight displays 20 may be configured to function as, for example, a primary flight display (PFD) used to display altitude, airspeed, vertical speed, and navigation and traffic collision avoidance system (TCAS) advisories. One or more of the flight displays 20 may also be configured to function as, for example, a multi-function display used to display navigation maps, weather radar, electronic charts, TCAS traffic, aircraft maintenance data and electronic checklists, manuals, and procedures. One or more of the flight displays 20 may also be configured to function as, for example, an engine indicating and crew-alerting system (EICAS) display used to display critical engine and system status data. Other types and functions of the flight displays 20 are contemplated as well. According to various exemplary embodiments of the inventive concepts disclosed herein, at least one of the flight displays 20 may be configured to display a visual representation of a widget generated according to the systems and methods of the inventive concepts disclosed herein.

In some embodiments, the flight displays 20 may provide an output based on data received from a system external to an aircraft, such as a ground-based weather radar system, satellite-based system, or from a system of another aircraft. In some embodiments, the flight displays 20 may provide an output from an onboard aircraft-based weather radar system, LIDAR system, infrared system or other system on an aircraft. For example, the flight displays 20 may include a weather display, a weather radar map, and a terrain display. In some embodiments, the flight displays 20 may provide an output based on a combination of data received from multiple external systems or from at least one external system and an onboard aircraft-based system. The flight displays 20 may include an electronic display or a synthetic vision system (SVS). For example, the flight displays 20 may include a display configured to display a two-dimensional (2-D) image, a three dimensional (3-D) perspective image of terrain and/or weather information, or a four dimensional (4-D) display of weather information or forecast information. Other views of terrain and/or weather information may also be provided (e.g., plan view, horizontal view, vertical view). The views may include monochrome or color graphical representations of the terrain and/or weather information. Graphical representations of weather or terrain may include an indication of altitude of the weather or terrain or the altitude relative to an aircraft.

The UI elements 22 may include, for example, dials, switches, buttons, touch screens, keyboards, a mouse, joysticks, cursor control devices (CCDs), menus on Multi-Functional Displays (MFDs), or other multi-function key pads certified for use with avionics systems. The UI elements may be incorporated by the flight displays 20 (e.g., the UI elements 22 may appear on or be part of the flight displays 20). The UI elements 22 may be configured to, for example, allow an aircraft crew member to interact with various avionics applications and perform functions such as data entry, manipulation of navigation maps, and moving among and selecting checklist items. For example, the UI elements 22 may be used to adjust features of the flight displays 20, such as contrast, brightness, width, and length. The UI elements 22 may also (or alternatively) be used by an aircraft crew member to interface with or manipulate the displays of the flight displays 20. For example, the UI elements 22 may be used by aircraft crew members to adjust the brightness, contrast, and information displayed on the flight displays 20. The UI elements 22 may additionally be used to acknowledge or dismiss an indicator provided by the flight displays 20. The UI elements 22 may be used to correct errors on the flight displays 20. The UI elements 22 may also be used to adjust the radar antenna tilt, radar display gain, and to select vertical sweep azimuths. Other UI elements 22, such as indicator lights, displays, display elements, and audio alerting devices, may be configured to warn of potentially threatening conditions such as severe weather, terrain, and obstacles, such as potential collisions with other aircraft.

Figure 2A:
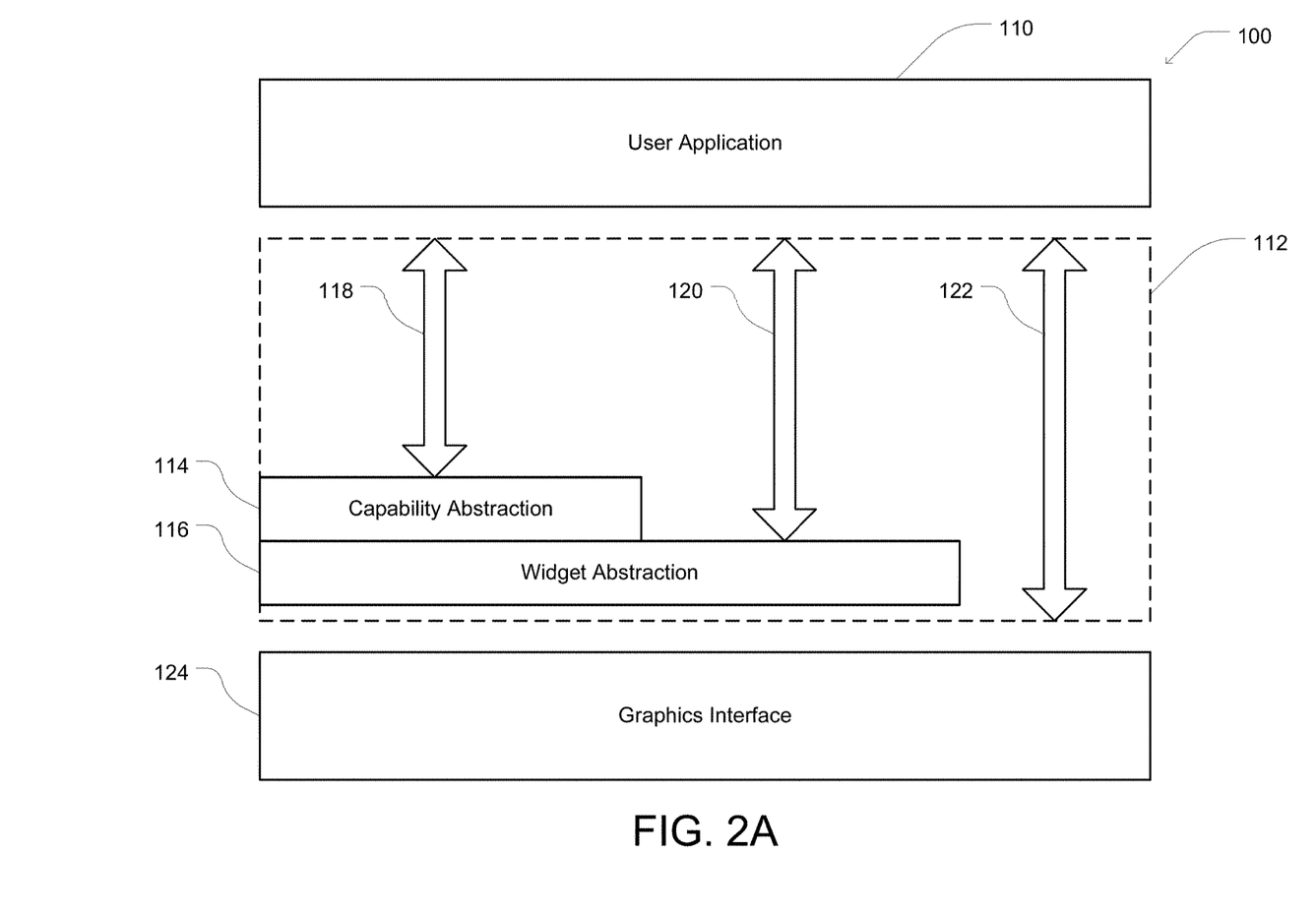
FIG. 2A is a schematic diagram of an exemplary embodiment of a process flow for an avionics graphics interface according to the inventive concepts disclosed herein.
Figure 2B:
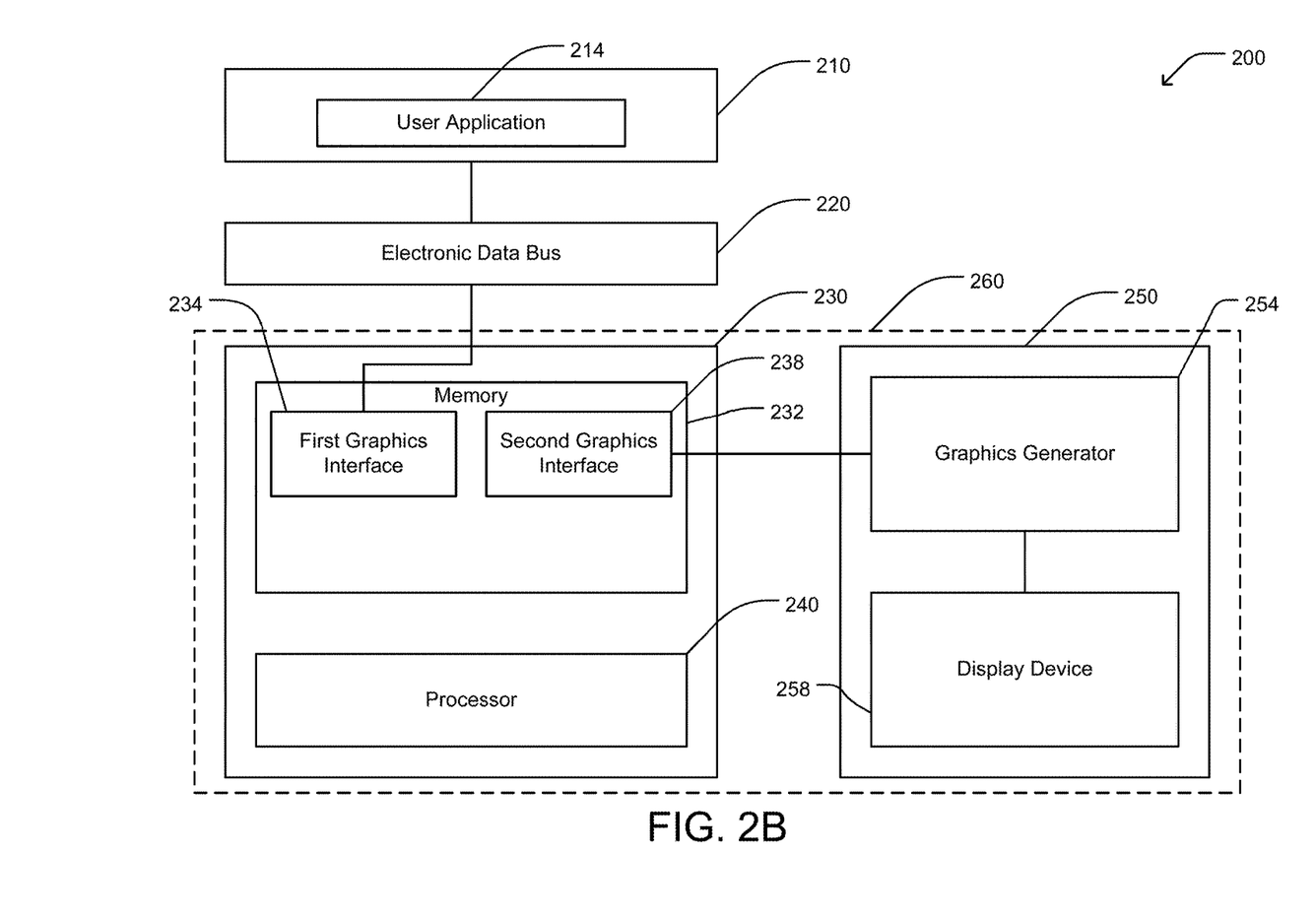
FIG. 2B is a block diagram of an exemplary embodiment of a system including an avionics graphics interface according to the inventive concepts disclosed herein.

Referring now to FIG. 2, a schematic diagram of a process flow 100 is shown according to an exemplary embodiment of the inventive concepts disclosed herein. The process flow 100 includes an application 110 (e.g., a user application), a first graphics interface 112, and a second graphics interface 124. The application 110 can be included in a first avionics system (e.g., a radar system, a navigation system, a flight control system). The application 110 can be configured to generate first graphics instructions for generating a widget (e.g., a widget as described in U.S. patent application Ser. No. 14/499,649, titled "Run-Time Widget Creating System, Device and Method," filed Sep. 29, 2014, which is incorporated herein by reference). For example, the application 110 can generate function calls to widget generation functions and transport the function calls via the first graphics interface 112 to the second graphics interface 124, and/or further to a display device configured to display the widget. The application 110 can be or include a software application executed by processing hardware electronics of the first avionics system (e.g., hardware electronics analogous to processor 240 and/or memory 230 described herein with reference to FIG. 2B). The application 110 can be developed by an end user and included in the first avionics system, and can be integrated with other components of the airborne platform when the first avionics system is integrated (e.g., installed in, connected to) with the airborne platform.

The application 110 can receive avionics data from the first avionics system and generate the first graphics instructions based on the avionics data and/or responsive to the avionics data. For example, if the avionics data is an airspeed, the application 110 can receive the airspeed and generate the first graphics instructions based on the airspeed so that the display device displays the airspeed.

The first graphics interface 112 is configured to receive the first graphics instructions from the user application 110 and generate second graphics instructions based on the first graphics instructions. The first graphics interface 112 can generate the second graphics instructions in response to receiving the first graphics instructions. The first graphics interface 112 can be included in a second avionics system of the airborne platform (e.g., a cockpit display system or other display system). The first graphics interface 112 can be or include a software application executed by processing hardware electronics of the second avionics system (e.g., hardware electronics analogous to processor 240 and/or memory 230 described herein with reference to FIG. 2B). The first graphics interface 112 can be an application programming interface.

The first graphics interface 112 can include one or more abstraction layers. The abstraction layers can correspond to heterogeneous tiers of abstraction provided by the first graphics interface 112 for functions that can be used by the application 110. The abstraction layers can abstract (e.g., handle independently of, process independently of, handle separately from, process separately from, render invisible, simplify) functions used by the process flow 100 for generating and display a widget when those functions are exposed to the application 110. This can expedite development of the application 110, as the application 110 need not be made aware of, or generate instructions directed to, every function and/or parameter required to display a widget. Instead, the first graphics interface 112 can handle certain functions or parameters without requiring instructions from the application 110 pertaining to those functions or parameters.

As shown in FIG. 2A, the first graphics interface 112 includes a first abstraction layer 114 (e.g., a capability abstraction layer) and a second abstraction layer 116 (e.g., a widget abstraction layer). The abstraction layers 114, 116 can be used (e.g., accessed, manipulated, selected for exposing functions to the application 110) based on an abstraction mode associated with or corresponding to the first graphics instructions received from the application 110. For example, the first graphics interface can identify (or include) a first abstraction mode 118 (e.g., an "easy" mode), a second abstraction mode 120 (e.g., an "intermediate" mode), and a third abstraction mode 122 (e.g., an "expert" mode).

The first abstraction mode 118 is associated with or corresponds to the first abstraction layer 114. In some embodiments, the first abstraction layer 114 is configured to generate the second graphics instructions independent of first graphics instructions for an integration protocol for conforming the widget to the display device, and independent of a communication protocol for communicating the second graphics instructions to the display device via the second graphics interface 124.

The second abstraction mode 120 is associated with or corresponds to the second abstraction layer 116. In some embodiments, the second abstraction layer 116 is configured to generate the second graphics instructions independent of a communication protocol for communicating the second graphics instructions to the display device via the second graphics interface 124. As compared to some embodiments of the first abstraction layer 114, the second abstraction layer 116 can expose more (e.g., additional and/or more complex) functions to the application 110. For example, while the first abstraction layer 114 can be configured to abstract functions associated with an integration protocol for conforming the widget to the display device (e.g., an integrational protocol associated with functions such as windowing and scaling the widget based on physical or display specifications of the display device), the second abstraction layer 116 can expose functions associated with the integration protocol to the application 110. This can allow a user developing the application 110 to have more control over integration of the widget and the display device in the second abstraction layer 116 as opposed to the first abstraction layer 114.

The third abstraction mode 122 is associated (e.g., directly associated) with the second graphics interface 124. For example, in the third abstraction mode 122, the first graphics interface 112 can expose functions of the second graphics interface 124 to the application 110, and/or pass arguments of function calls in the first graphics instructions directly to corresponding functions of the second graphics interface 124 when generating the second graphics instructions.

In some embodiments, the first graphics interface 112 is configured to identify the abstraction mode associated with the first graphics instructions. For example, the first graphics instructions can include an identifier of the abstraction mode, and the first graphics interface 112 can parse the first graphics instructions to identify the abstraction mode. The first graphics interface 112 can also process the first graphics instructions to identify function calls in the first graphics instructions, and determine the abstraction mode based on the function calls. For example, if the first graphics instructions include function calls to integration protocol functions or communication protocol functions, the first graphics interface 112 can identify the abstraction mode as being a mode in which integration protocol functions or communication protocol functions are handled by the first graphics instructions rather than the first graphics interface 112. In some embodiments, a third graphics interface can be configured to receive the first graphics instructions from the application 110, identify the abstraction mode associated with the first graphics instructions, and provide the first graphics instructions together with the abstraction mode to the first graphics interface 112.

The second graphics interface 124 is configured to generate a widget based on the second graphics instructions. The second graphics interface 124 can include a plurality of widget generation functions for generating the widget based on the second graphics instructions. The second graphics interface 124 can receive the second graphics instructions as function calls to corresponding widget generation functions.

In some embodiments, the first graphics interface 112 includes abstraction functions that process the first graphics instructions to generate the second graphics instructions. The abstraction functions can correspond to one or more of the widget generation functions of the second graphics interface 124.

The first graphics interface 112 can receive the first graphics instructions, identify that the abstraction mode associated with the first graphics instructions corresponds to the first abstraction layer 114, determine that a first set of the first graphics instructions are to be handled by the first abstraction layer 114, and determine that a second set of the first graphics instructions are to be handled by the widget generation functions of the second graphics interface 124. In an exemplary embodiment illustrating the relationships of the process flow 100, the first graphics instructions can be for generating an airspeed widget, and the second graphics interface 124 can include widget generation functions including an airspeed value function, a communication protocol function, and an integration protocol function. The first graphics interface 112, having determined that the first graphics instructions are to be handled by the first abstraction layer 114 (e.g., based on an identified abstraction mode) can (1) generate a portion of the second graphics instructions by processing the first graphics instructions to identify an airspeed value in order to pass the airspeed value to the airspeed value function; (2) generate a portion of the second graphics instructions by executing a default or pre-determined communication protocol function based on the abstraction mode and pass the results to the communication protocol function of the second graphics interface 124; and (3) generate a portion of the second graphics instructions by executing a default or pre-determined integration protocol function based on the abstraction mode and pass the results to the integration protocol function of the second graphics interface 124. In such embodiments, the application 110 can be exposed to functions correspond to an abstraction mode of the application 110, while the first graphics interface 112 abstracts functions that are not exposed to the application 110, which can reduce the complexity of generating the widget for the application 110. First graphics instructions can be received by the first graphics interface 112 and, depending on an abstraction mode associated with the first graphics instructions, be handled by functions of the abstraction layers 114, 116 which then process the first graphics instructions to generate second graphics instructions that can be handled by the second graphics interface 124, or be passed to the second graphics interface 124 (e.g., if the first graphics instructions or a portion thereof are not to be abstracted).

Referring now to FIG. 2B, an exemplary embodiment of a system 200 is illustrated according to the inventive concepts disclosed herein. The system 200 or components thereof can incorporate features of the process flow 100 described with reference to FIG. 2A. The system 200 includes a first avionics system 210, a processing circuit 230, and a display system 250. The first avionics system 210 includes a user application 214 configured to generate first graphics instructions. The processing circuit includes a processor 240 and a memory 232 that includes a first graphics interface 234 configured to generate second graphics instructions based on the first graphics instructions, and a second graphics interface 238 configured to generate a widget based on the second graphics instructions. The display system 250 includes a display device 258 configured to display a visual representation of the widget. In some embodiments, the system 200 further includes an electronic data bus 220 by which the first avionics system 210 communicates with the processing circuit 230. In some embodiments, the display system 250 includes a graphics generator 254 configured to receive the widget from the second graphics interface 238 and generate the visual representation of the widget.

Referring now to FIG. 2B in further detail, the user application 214 can be similar or identical to the application 110 described with reference to FIG. 2A. The user application 214 can enable the avionics system 210 to display widgets on the display device 258. The user application 214 can generate first graphics instructions that include information on how to display the widget requested by the avionics system 210. While FIG. 2B illustrates a single avionics system 210 that includes a single user application 214, in various embodiments, the inventive concepts disclosed herein can interact with a plurality of avionics systems and user applications, including avionics systems having multiple user applications. The components described herein can receive and process graphics instructions from multiple user applications simultaneously, such that the display system 250 can display visual representations of multiple widgets simultaneously.

In some embodiments, a second avionics system 260 includes the processing circuit 230 and the display system 250. The second avionics system 260 can be or include an aircraft cockpit display system. In some embodiments, the second avionics system 260 is an integrated or monolithic system (e.g., can be installed in an airborne platform as a single device). In some embodiments, the second avionics system 260 is a distributed system (e.g., can be installed in an airborne platform as multiple devices, such as a first device including the processing circuit 230 and a second device including the display system 250).

The electronic data bus 220 can be communicatively coupled to the avionics system 210 and the processing circuit 260. The electronic data bus 220 can be a wired data bus enabling communication between various systems of an airborne platform. While FIG. 2B illustrates the processing circuit 230 as communicating with the display system 250 separately from the electronic data bus 220, in some embodiments, the processing circuit 230 can additionally or alternatively communicate with the display system 250 via the electronic data bus 220. In some embodiments, the electronic data bus 220 is configured according to an ARINC-661 standard or specification, and the components of the system 200 that communicate via the electronic data bus 220 can include communication interfaces that conform to the ARINC-661 standard.

The processor 240 may be implemented as a specific purpose processor, an application specific integrated circuit (ASIC), one or more field programmable gate arrays (FPGAs), a group of processing components, or other suitable electronic processing components. The memory 232 is one or more devices (e.g., RAM, ROM, flash memory, hard disk storage) for storing data and computer code for completing and facilitating the various user or client processes, layers, and modules described in the present disclosure. The memory 232 may be or include volatile memory or non-volatile memory and may include database components, object code components, script components, or any other type of information structure for supporting the various activities and information structures of the inventive concepts disclosed herein. The memory 232 is communicably connected to the processor 240 and includes computer code or instruction modules for executing one or more processes described herein. The memory 232 includes various circuits, software engines, and/or modules that cause the processor 240 to execute the systems and methods described herein. As shown in FIG. 2B, the memory includes the first graphics interface 234 and the second graphics interface 238.

The first graphics interface 234 can be similar or identical to the first graphics interface 112 described with reference to FIG. 2A. In some embodiments, the first graphics interface is configured to receive first graphics instructions from the user application 214, identify an abstraction mode of the user application 214 or the first graphics instructions, and generate second graphics instructions based on the first graphics instructions and the abstraction mode.

In some embodiments, the first graphics interface 234 includes at least one abstraction layer associated with the abstraction mode of the first graphics instructions. The at least one abstraction layer can determine whether the first graphics instructions are passed to the second graphics interface 238 for processing, or if functions of the second graphics interface 238 are abstracted. For example, each abstraction layer can include an abstraction function which can be exposed to the user application 214, to receive arguments for instructions for generating a widget that can then be passed to the second graphics interface 238 in an appropriate format, and/or can handle widget generation instructions independently of or separately from the first graphics instructions. In such embodiments, the user application 214 is not required to generate first graphics instructions that can specify all aspects of widget generation.

The first graphics interface 234 can be configured to generate the second graphics instructions using the abstraction function. The first graphics interface 234 can be configured to select the abstraction layer corresponding to the abstraction mode of the first graphics instructions to generate the second graphics instructions.

In some embodiments, the second graphics interface 238 includes a plurality of widget generation functions. Each abstraction function of the first graphics interface 238 can be associated with one or more widget generation functions. The second graphics instructions can be associated with the widget generation function corresponding to the abstraction function used to generate the second graphics instructions.

In some embodiments, the at least one abstraction layer includes a widget abstraction layer in which the second graphics instructions are generated independent of (e.g., separately from, without, not based on) first graphics instructions for a communication protocol for communicating the second graphics instructions to the display system 250. For example, the widget abstraction layer can include abstraction functions that included pre-determined or default instructions used to communicate the second graphics instructions to the display system 250, such as a communication protocol associated with or compatible with ARINC-661. In such embodiments, the first graphics interface 234 can handle (e.g., manage, process, generate instructions for) communication aspects needed to generate and display the widget without requiring the first graphics instructions to explicitly describe those communication aspects.

In some embodiments, the at least one abstraction layer includes a capability abstraction layer in which the second graphics instructions are generated independent of graphics instructions for an integration protocol for conforming the widget to the display device 258. In such embodiments, the first graphics interface 234 can handle (e.g., manage, process, generate instructions for) integration aspects needed to generate and display the widget without requiring the first graphics instructions to explicitly describe those communication aspects.

In some embodiments, the first graphics interface 234 includes a transport layer. The transport layer can include or define functions dedicated to transporting or communicating graphics instructions. The transport layer can include a transport function configured to communicate the second graphics instructions to the display system 250. The transport function can include protocol information for communication the second graphics instructions based on an ARINC-661 standard, or based on a communication standard compatible with the electronic data bus 220. The first graphics interface 234 may be configured to generate a transport component of the second graphics instructions using the transport function or using the first graphics instructions depending on the abstraction mode. For example, if the abstraction mode is the first mode 118 as shown in FIG. 2A, the first graphics interface 234 can generate the second graphics instructions using the transport function, while if the abstraction mode is the third mode 122 shown in FIG. 2A, the first graphics interface 234 can generate the second graphics instructions using a communication protocol included in the first graphics instructions.

In some embodiments, the first graphics interface 234 (or the memory 232) includes an access restriction engine configured to selectively permit access to at least one abstraction layer of the first graphics interface 234. The access restriction engine can selectively permit access based on a credential received from the user application 214, or from another application in communication with the processing circuit 230. The access restriction engine can store a list or database of access credentials (e.g., pre-approved credentials or keys), such that the first graphics interface 234 can permit access to at least one abstraction layer based on identifying a match between the received access credential and the stored access credentials. The access credential can be configured to permit access to one or more abstraction layers. For example, the access credential can be configured to permit access to the "easy" mode 118 of FIG. 2A, or to both the "easy" mode 118 and "intermediate" mode 120, or to each of the modes. In various such embodiments, the use of access credentials can allow the first graphics interface 234 to selectively expose functions to the user application 210, and thus selectively control the level of abstraction or complexity made accessible to the user application 210.

In some embodiments, the graphics generator 254 is configured to generate a visual representation of the widget based on the widget received from the second graphics interface 238. For example, the graphics generator 254 can convert image information of the widget to a pixel representation of the widget for display by the display device 258. If the widget generated by the second graphics interface 238 includes image information of the widget and integration information for conforming the widget to the display device 258, the graphics generator 254 can modify the widget based on the integration information into a format compatible for display by the display device 258.

Figure 3:
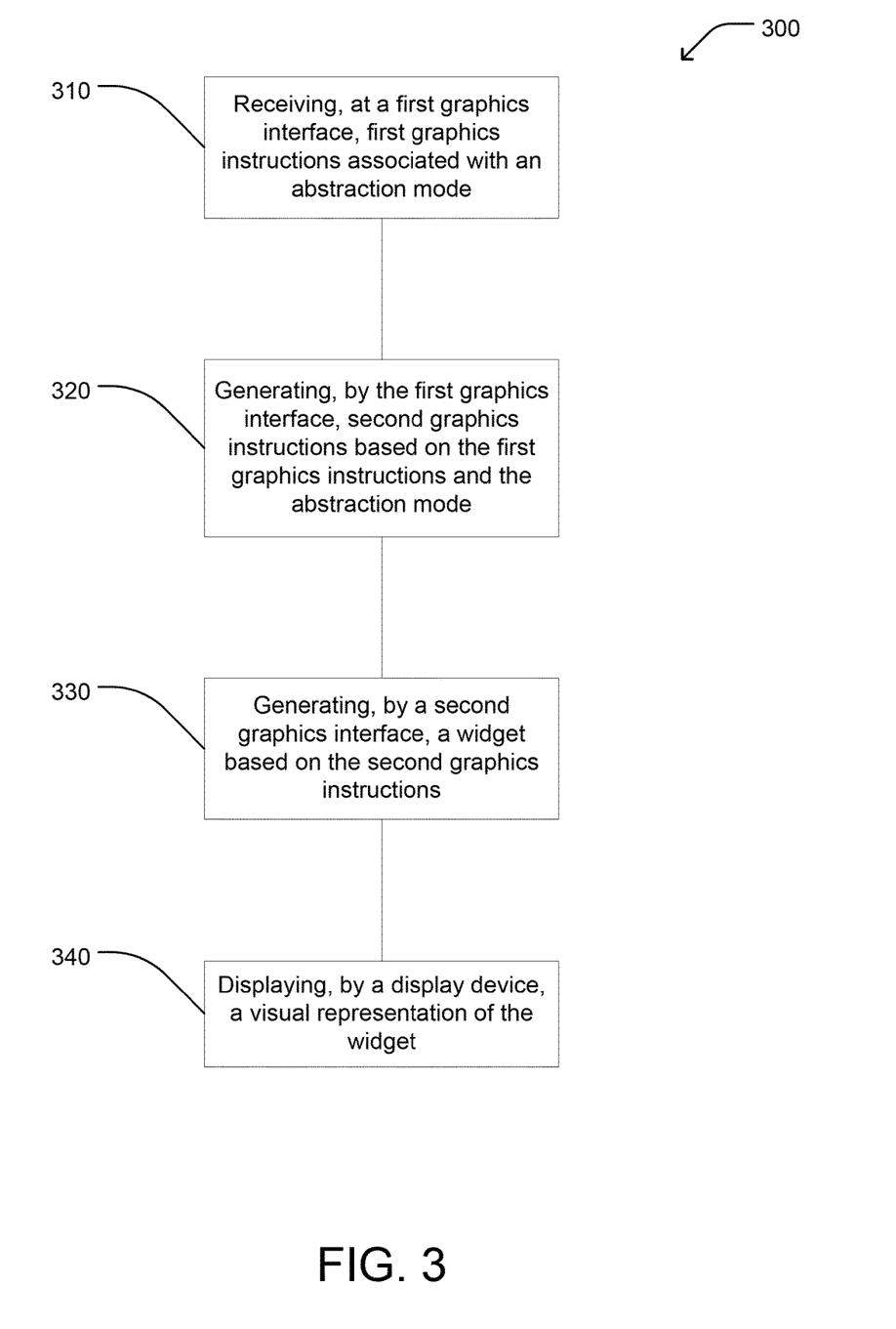
FIG. 3 is a diagram of an exemplary embodiment of a method for an avionics graphics interface according to the inventive concepts disclosed herein.

Referring now to FIG. 3, an exemplary embodiment of a method 300 according to the inventive concepts disclosed herein may include the following steps. The method 300 may be performed using various hardware, apparatuses, and systems disclosed herein, such as the aircraft control center 10, the process flow 100, the system 200, and/or components thereof.

A step (310) may include receiving, at a first graphics interface, first graphics instructions associated with an abstraction mode. The first graphics instructions can be received from a user application of an avionics system (e.g., a radar system). The first graphics instructions can correspond to a widget to be displayed based on actions of the avionics system or information received by the avionics system. The abstraction mode can indicate functions to be exposed by the first graphics interface to the user application for generating the first graphics instructions, and/or a level of abstraction of the first graphics instructions.

A step (320) may include generating, by the first graphics interface, second graphics instructions based on the first graphics instructions and the abstraction mode. The abstraction mode can indicate whether functions of the first graphics interface or the second graphics interface are exposed to the user application, or whether the first graphics instructions include calls to functions of the first graphics interface (e.g., abstraction functions which can process the first graphics instructions and generate second graphics instructions that are calls to functions of the second graphics interface, such as widget generation functions) or calls to functions of the second graphics interface that can be passed to the second graphics interface by the first graphics interface (e.g., the first graphics interface can pass arguments of the function calls in the first graphics instructions to the second graphics interface so that the second graphics interface can process the arguments using second graphics interface functions, such as widget generation functions). Based on the abstraction mode, the first graphics interface can determine or select an abstraction layer that includes appropriate functions for processing the first graphics instructions and/or passing the first graphics instructions to the second graphics interface. For example, if the abstraction mode is configured to handle aspects of the look or feel of the widget while abstracting integration aspects for confirming the widget to a display device, and/or abstraction communication aspects for communicating the widget according to the ARINC-661 specification, the first graphics interface can use abstraction functions that generate second graphics instructions corresponding to the integration protocol and/or the communication protocol separately from or independently of the first graphics instructions.

A step (330) may include generating, by the second graphics interface, a widget based on the second graphics instructions. The second graphics interface can include one or more widget generation functions that process the second graphics instructions to generate the widget, including generating information for how to communicate the widget according to the ARINC-661 specification to a display system, and for how to conform the widget to a display device of the display system. The widget can include information indicating how the widget is to be displayed (e.g., an arrangement of pixels for displaying the widget), or can include information for use by a display device to convert the widget to an arrangement of pixels.

A step (340) may include displaying, by a display device, a visual representation of the widget. The display device can receive the widget and display the visual representation (e.g., image or sequence of images) of the widget. The display device can include a graphics generator configured to receive the widget and generate the visual representation based on the widget, and then transmit the visual representation to the display device.

As will be appreciated from the above, systems and methods for an avionics graphics interface according to embodiments of the inventive concepts disclosed herein may improve operation of aircraft avionics systems by abstracting complexities associate with graphics interface specifications, such as the ARINC-661 specification, and expediting communication between user applications and avionics systems, as well as expediting development of user applications.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system comprising:
   a display system;

a first graphics interface configured to receive first graphics instructions from a user application, identify an abstraction mode of the user application, and generate second graphics instructions based on the first graphics instructions and the abstraction mode, the first graphics interface including at least one abstraction layer associated with the abstraction mode of the first graphics instructions, each abstraction layer including an abstraction function, the first graphics interface configured to generate the second graphics instructions using the abstraction function, the first graphics interface including a transport layer including a transport function configured to communicate the second graphics instructions to the display system, the first graphics interface configured to generate a transport component of the second graphics instructions using the transport function or using the first graphics instructions depending on the abstraction mode; and a second graphics interface configured to receive the second graphics instructions from the first graphics interface and generate a widget based on the second graphics instructions;

the display system comprising a graphics generator and a display device, the graphics generator configured to generate a visual representation based on the widget, the display device configured to display the visual representation.

2. The system of claim 1, wherein the second graphics interface comprises a plurality of widget generation functions, each abstraction function is associated with a widget generation function, and the second graphics instructions are associated with the widget generation function corresponding to the abstraction function used to generate the second graphics instructions.

3. The system of claim 1, wherein the at least one abstraction layer includes a widget abstraction layer in which the second graphics instructions are generated independent of first graphics instructions for a communication protocol for communicating the second graphics instructions to the display system.

4. The system of claim 1, wherein the first graphics interface is configured to identify the abstraction mode of the first graphics instructions based on at least one of an identifier or a function call included in the first graphics instructions.

5. The system of claim 1, wherein the at least one abstraction layer includes a capability abstraction layer in which the second graphics instructions are generated independent of first graphics instructions for an integration protocol for conforming the widget to the display device and a communication protocol for communicating the second graphics instructions to the display system.

6. The system of claim 1, wherein the first graphics interface is configured to select the abstraction layer corresponding to the abstraction mode of the first graphics instructions to generate the second graphics instructions.

7. The system of claim 1, wherein the first graphics interface comprises an access restriction engine configured to selectively permit access to the at least one abstraction layer based on a credential received from the user application.

8. An airborne platform, comprising:
a first avionics system comprising an application, the application configured to generate first graphics instructions;
an electronic data bus communicatively coupled to the first avionics system;
a display device; and
a second avionics system communicatively coupled to the electronic data bus, the second avionics system comprising:
a processing circuit comprising a first graphics interface and a second graphics interface, the first graphics interface configured to receive the first graphics instructions from the first avionics system via the electronic data bus, identify an abstraction mode of the first graphics instructions, and generate second graphics instructions based on the first graphics instructions and the abstraction mode, the first graphics interface including at least one abstraction layer associated with the abstraction mode of the first graphics instructions, each abstraction layer including an abstraction function, the first graphics interface configured to generate the second graphics instructions using the abstraction function, the first graphics interface including a transport layer including a transport function configured to communicate the second graphics instructions to the display device, the first graphics interface configured to generate a transport component of the second graphics instructions using the transport function or using the first graphics instructions depending on the abstraction mode the second graphics interface configured to receive the second graphics instructions from the first graphics interface and generate a widget based on the second graphics instructions;
the display device configured to display a visual representation of the widget.

9. The airborne platform of claim 8, wherein the processing circuit further comprises a graphics generator configured to generate the visual representation based on the widget.

10. The airborne platform of claim 8, wherein:
the first graphics interface comprises a plurality of graphics functions and at least one abstraction layer is associated with at least one graphics function;
the first graphics instructions comprise function calls to the graphics functions; and
the first graphics interface is configured to generate the second graphics instructions further using the abstraction layer associated with the abstraction mode of the first graphics instructions.

11. The system of claim 10, wherein the second graphics interface comprises a plurality of widget generation functions, each graphics function of the first graphics interface is associated with a widget generation function, and the second graphics instructions are associated with the widget generation functions corresponding to the abstraction layer used to generate the second graphics instructions.

12. The system of claim 10, wherein the at least one abstraction layer includes a widget abstraction layer comprising functions for a communication protocol for communicating the second graphics instructions to the display device.

13. The system of claim 10, wherein the at least one abstraction layer includes a capability abstraction layer comprising functions for an integration protocol for conforming the widget to the display device.

14. A method, comprising:
receiving, at a first graphics interface, first graphics instructions associated with an abstraction mode;
generating, by the first graphics interface, second graphics instructions based on the first graphics instructions and the abstraction mode using an abstraction function of at least one abstraction layer of the first graphics interface, the at least one abstraction layer associated with the abstraction mode of the first graphics instructions;

generating, by the first graphics interface, a transport component of the second graphics instructions using, depending on the abstraction mode: (1) a transport function of a transport layer of the first graphics interface that communicates the second graphics instructions to a display device or (2) the first graphics instructions;

generating, by a second graphics interface, a widget based on the second graphics instructions; and displaying, by the display device, a visual representation based on the widget.

15. The method of claim 14, wherein generating the second graphics instructions further comprises selecting widget generation functions of the second graphics interface based on the abstraction function of the abstraction layer associated with the abstraction mode.

16. The method of claim 14, further comprising receiving, at the first graphics interface, a credential, and selectively permitting access to the at least one abstraction layer based on the credential.

17. The airborne platform of claim 8, wherein the application is configured to receive avionics data from the first avionics system and generate the first graphics instructions based on the avionics data.

18. The airborne platform of claim 8, wherein the second graphics interface comprises an ARINC-661 graphics application programming interface.

* * * * *